Figure 1:
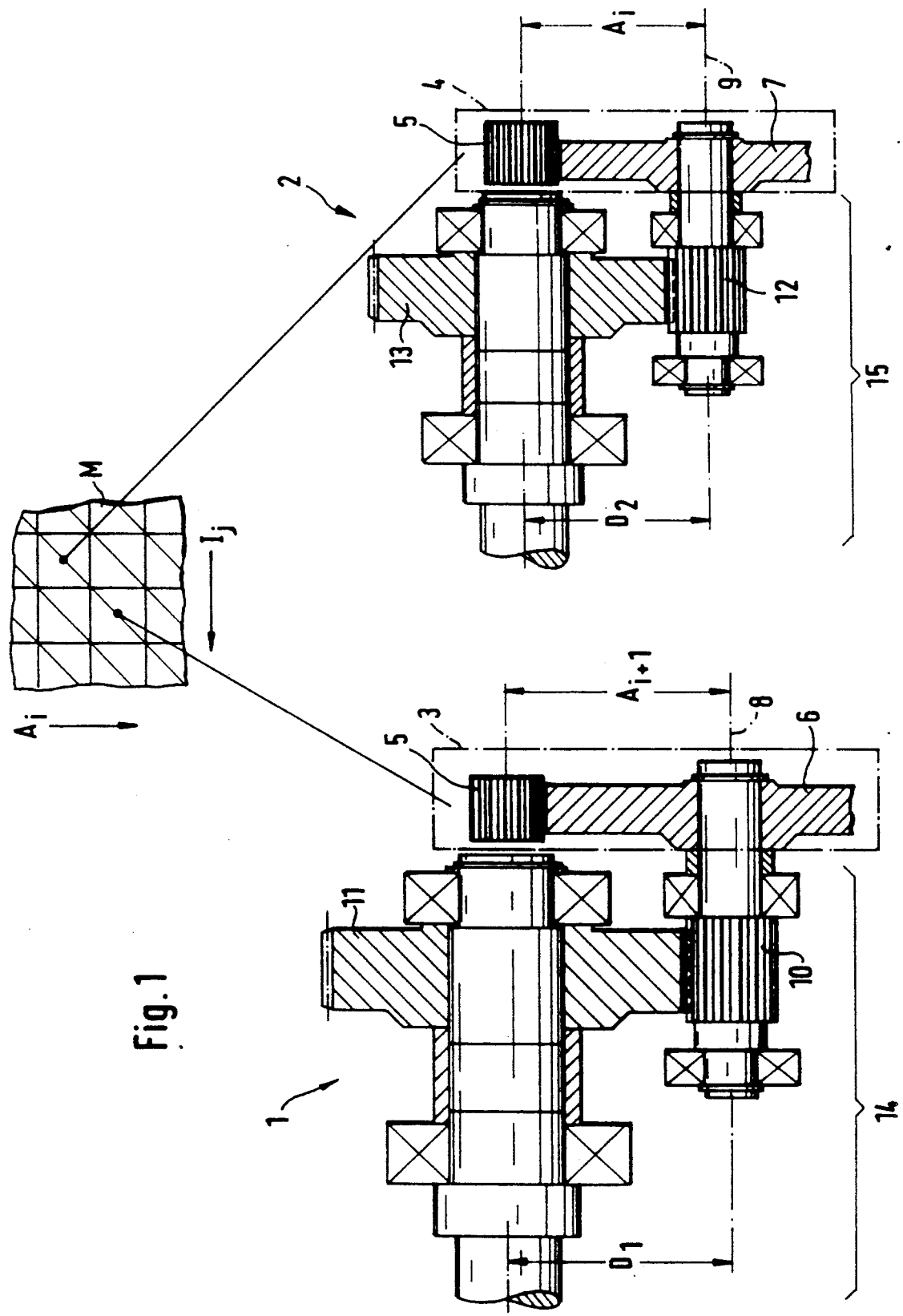

United States Patent [19]

Lachenmaier

[11] Patent Number: 5,067,361

[45] Date of Patent: Nov. 26, 1991

[54] TRANSMISSION SERIES

[76] Inventor: Sepp Lachenmaier, Händelstrasse 9, 7500 Karlsruhe 21, Fed. Rep. of Germany

[21] Appl. No.: 682,293

[22] Filed: Apr. 9, 1991

[30] Foreign Application Priority Data

Apr. 14, 1990 [DE] Fed. Rep. of Germany ....... 4012188

[51] Int. Cl.$^5$ .............................................. F16H 3/08
[52] U.S. Cl. ................................... 74/325; 74/421 R
[58] Field of Search ................................. 74/325, 421

[56] References Cited

U.S. PATENT DOCUMENTS

| 3,148,556 | 9/1964 | Gibbs et al. | 74/325 |
| 3,410,148 | 12/1968 | Clarke | 74/325 X |
| 3,673,885 | 7/1972 | Hansen | 74/325 X |

FOREIGN PATENT DOCUMENTS

| 0280896 | 9/1988 | European Pat. Off. . |
| 2061021 | 4/1982 | Fed. Rep. of Germany . |
| 3705812 | 9/1988 | Fed. Rep. of Germany . |

*Primary Examiner*—Dirk Wright
*Attorney, Agent, or Firm*—Armstrong, Nikaido, Marmelstein, Kubovcik & Murray

[57] ABSTRACT

Transmission series with a variable gear stage (variation stage) consisting of a pair of gearwheels. Within the series, the variation stage encompasses a range of permissible sizes ($B_i = B_1 \ldots B_m$) which in each case have the same centre distances ($A_i = A_1 \ldots A_m$). The same range of permissible transmission ratios ($I_i = I_1 \ldots I_n$) is provided for all sizes, so that the centre distances ($A_i$) and the transmission ratios ($I_i$) form a matrix (M). The number of components required is substantially reduced by correlating the graduation of the centre distances ($A_i$) and the graduation of the transmission ratios ($I_i$) in such a way that the same gearwheel is used in a variation stage sequence (S) comprising a number of variation stage sizes.

9 Claims, 5 Drawing Sheets

Fig. 2

| $B_i$ \ $I_i$ | $I_4$ 10.0 | $I_3$ 8.1 | $I_2$ 6.4 | $I_1$ 5.1 | $A_i$ |
|---|---|---|---|---|---|
| $B_1$ | $\frac{120}{12}$ ($P_7$) 0.80 | $\frac{96}{12}$ ($P_6$) 0.97 | $\frac{77}{12}$ ($P_8$) 1.18 | $\frac{62}{12}$ ($P_{10}$) 1.43 | $A_1 = 56.0$ |
| $B_2$ | $\frac{120}{12}$ ($P_5$) 0.97 | $\frac{96}{12}$ ($P_4$) 1.18 | $\frac{77}{12}$ ($P_9$) 1.43 | $\frac{62}{12}$ ($P_{13}$) 1.74 | $A_2 = 68.1$ |
| $B_3$ | $\frac{120}{12}$ ($P_3$) 1.18 | $\frac{96}{12}$ ($P_2$) 1.43 | $\frac{77}{12}$ ($P_{12}$) 1.74 | $\frac{62}{12}$ ($P_{15}$) 2.11 | $A_3 = 82.7$ |
| $B_4$ | $\frac{120}{12}$ ($P_1$) 1.43 | $\frac{96}{12}$ ($P_{11}$) 1.74 | $\frac{77}{12}$ ($P_{14}$) 2.11 | $\frac{62}{12}$ ($P_{16}$) 2.57 | $A_4 = 100.5$ |

$S_4$, $S_3$, $S_2$, $S_1$, $S_5$, $S_6$, $S_7$, M

Fig. 4

| A (mm) ↓ | 10.0 | 8.1 | 6.5 | 5.3 | 4.2 | 3.3 | 2.6 |
|---|---|---|---|---|---|---|---|
| 42.0 | $\frac{120}{12}$ / 0.60 | $\frac{97}{12}$ / 0.72 | $\frac{78}{12}$ / 0.87 | $\frac{64}{12}$ / 1.05 | $\frac{50}{12}$ / 1.27 | $\frac{40}{12}$ / 1.53 | $\frac{31}{12}$ / 1.84 |
| 50.7 | $\frac{120}{12}$ / 0.72 | $\frac{97}{12}$ / 0.87 | $\frac{78}{12}$ / 1.05 | $\frac{64}{12}$ / 1.27 | $\frac{50}{12}$ / 1.53 | $\frac{40}{12}$ / 1.84 | $\frac{31}{12}$ / 2.25 |
| 61.2 | $\frac{120}{12}$ / 0.87 | $\frac{97}{12}$ / 1.05 | $\frac{78}{12}$ / 1.27 | $\frac{64}{12}$ / 1.53 | $\frac{50}{12}$ / 1.84 | $\frac{40}{12}$ / 2.25 | $\frac{31}{12}$ / 2.72 |
| 73.9 | $\frac{120}{12}$ / 1.05 | $\frac{97}{12}$ / 1.27 | $\frac{78}{12}$ / 1.53 | $\frac{64}{12}$ / 1.84 | $\frac{50}{12}$ / 2.25 | $\frac{40}{12}$ / 2.72 | $\frac{31}{12}$ / 3.30 |
| 89.2 | $\frac{120}{12}$ / 1.27 | $\frac{97}{12}$ / 1.53 | $\frac{78}{12}$ / 1.84 | $\frac{64}{12}$ / 2.25 | $\frac{50}{12}$ / 2.72 | $\frac{40}{12}$ / 3.30 | $\frac{36}{14}$ / 3.30 |
| 107.7 | $\frac{120}{12}$ / 1.53 | $\frac{97}{12}$ / 1.84 | $\frac{78}{12}$ / 2.25 | $\frac{64}{12}$ / 2.72 | $\frac{50}{12}$ / 3.30 | $\frac{46}{14}$ / 3.30 | $\frac{36}{14}$ / 4.00 |
| 130.0 | $\frac{120}{12}$ / 1.84 | $\frac{97}{12}$ / 2.25 | $\frac{78}{12}$ / 2.72 | $\frac{64}{12}$ / 3.30 | $\frac{59}{14}$ / 3.30 | $\frac{46}{14}$ / 4.00 | $\frac{44}{17}$ / 4.00 |

← I

TRANSMISSION SERIES

The invention relates to a series of gear transmit with a variable gear stage consisting of a pair of gearwheels. This stage is also termed "variation stage" herein. Within the series this stage can conform to a fixed range of permissible sizes, each size corresponding to a specific centre distance of the gearwheel pair. In addition, within the series the variation stage can possess a range of transmission ratios which range is the same for all model sizes, so that the transmissions within the series form a matrix in a plane defined by the centre distances and the transmission ratios.

For such a series of gear transmissions the term "matrix type series" will occasionally be used herein. Such matrix type transmission series are commercially available (e.g. from Steber GmbH, Pforzheim, Germany).

Obviously the actual transmission ratios of different sizes of the variation stage can not exactly correspond to the respective nominal transmission ratios (among others because the number of gear teeth can only be changed in intergers). Deviations of the actual transmission ratio from the nominal transmission ratio of up to $+/-5\%$, preferably $+/-3\%$ are generally accepted.

Large-scale transmissions are oftentimes designed and manufactured with a particular application in view. Compared to the high total costs of such transmission systems, the expenditure for a special design is relatively unimportant. For small-scale transmissions, such as are used in large quantities in particular in the capital goods section, it is not economically viable to prepare a special design for each application.

The present invention relates primarily to small and medium-size transmissions (transmitting a power of 0.1 to 100 kW). To match the supply to a variety of applications it is often necessary to offer a comprehensive selection of a single transmission type corresponding to a diversity of transmission ratios and loading capacities (torques). Important fields of application are materials-handling technology and machine tool construction, and the invention is of special significance with regard to geared motors.

Details about the design requirements concerning gear transmission series are known to the skilled person or may be taken from appropriate literature. An example is the article of Volkmar Kunze: "Turpak-eine neue Zahnradgetriebe-Baureihe" in antriebstechni, 2/1990, p. 40 to 45. A problem in the manufacture of a transmission series of this type is the expense of the large number of components required.

A number of attempts have been made to reduce such expenditure. For example. German published patent application 37 05 812 to Flender AG, published on Sep. 1, 1988 describes the possibility of making intermediate stages in a series of toothed gearing systems by arranging for every second transmission size to differ only in respect of a final-stage wheel while the rest of the transmission remains unchanged. According to another, older proposal, the total possible range of transmission ratios is achieved with a single train of gears, the maximum ratio being obtained by a multi-stage train using all the wheels, whereas transmissions with smaller ratios are achieved by omitting individual stages on the input and/or output sides. German patent specification 20 61 021 to Hansen Transmissions, published on Apr. 4, 1982 is an extension of this. While these proposals meet the requirements of certain applications and reduce the number of gearwheels required in a manufacturing series, one disadvantage is the large number of different housing variants, which also increases the manufacturing cost and restricts potential applications.

An object of the invention is therefore to lower the cost of manufacturing a matrix type series of gear transmissions, with special emphasis on geared motors, by reducing the number of different components needed for the entire series.

With a transmission series of the matrix type described at the outset, this purpose is achieved by coordinating the centre distances and transmission ratios of the variation stage with each other in such a way that the same gearwheel can be used in a sequence of models of the series which comprises several variation stage sizes. This normally requires that the gear modules be freely selected without regard for the normal standards.

The variation stage can, of course, be coupled to one or more stages on the input or output side to produce transmissions of any desired characteristics. It is, however, advantageous to combine a variation stage of a given size (but with different transmission ratios) always with the same set of other gear stages. It is then possible to manufacture a comprehensive set of transmissions of a single size but with various transmission ratios with a minimum of design and assembly modifications merely by changing the gearwheels of the variation stage.

Where in the past a variable stage for gear transmissions has been designed with a complete matrix of sizes and transmission ratios, different gearwheels have generally been used for each model of the series. A matrix made up of eight sizes and eight transmission ratios therefore generally required 64 different gearwheel pairs, or 128 gearwheels. In practice this figure was further increased by the fact that the transmissions of the series have to be adapted for example to different electric motors having different shapes and sizes of connection means. Since the variation stage usually is the entrance stage of the transmission its pinion has to be adapted to such differing motor and thus has to have various designs of connection means (connection variants). Assuming that three types of such connection variants for the smaller gearwheel (normally known as the "pinion" ) are necessary, we arrive at a total of $3 \times 64 + 64 = 256$ different gearwheels for the $8 \times 8$ matrix.

The invention enables the number of different to be drastically reduced. With the $8 \times 8$ series, the number of different pinions required, on the assumption of three variant connections, is in the optimum case reduced to 45 instead of 192, whereas the number of larger gearwheels of the pair (normally known as the "wheels") remains unchanged at 64.

Figure 3:
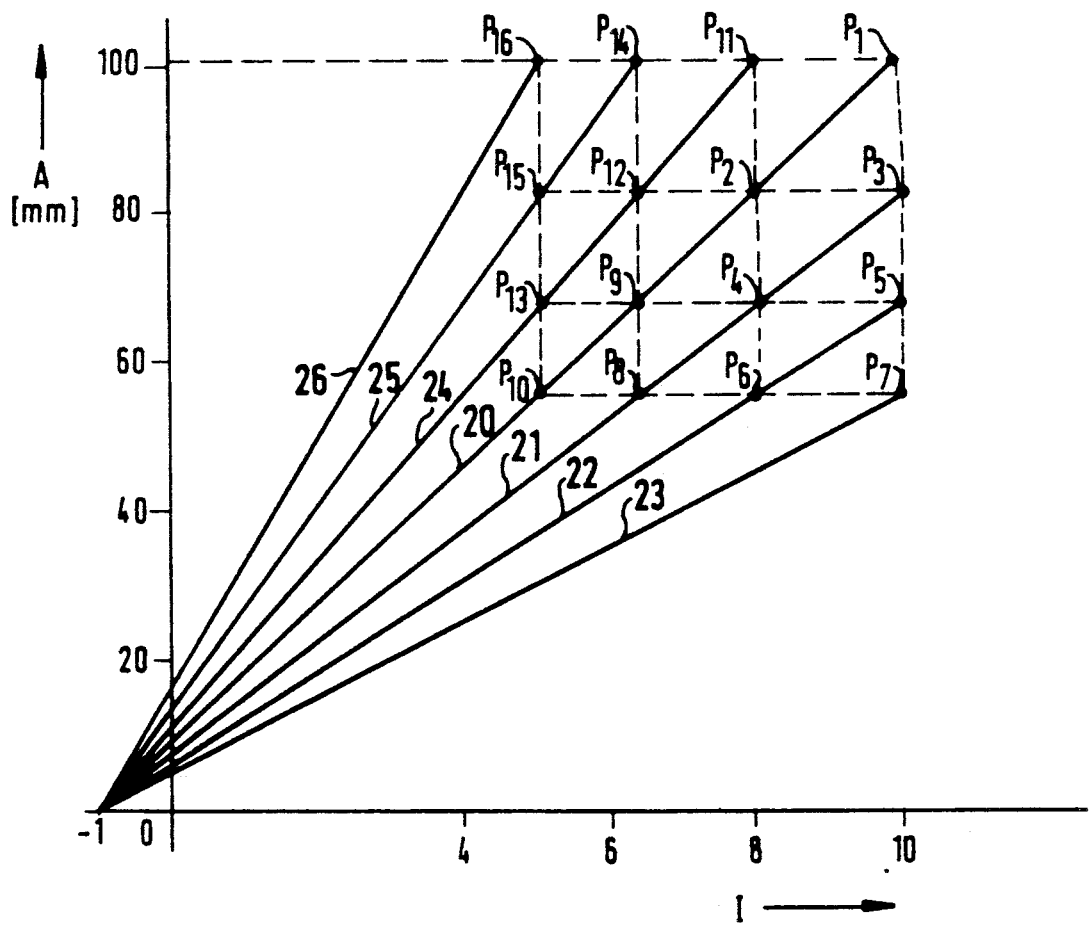

The invention is described below in greater detail on the basis of embodiments schematically represented in the Figures. These show:

FIG. 1 A highly schematic cross-sectional representation of two transmissions in a series in accordance with the invention;

FIG. 2 A matrix showing the characteristics of a series of variation stages in accordance with the invention;

FIG. 3 A graphic representation used to explain the invention;

FIG. 4 A matrix corresponding to FIG. 2 but for a larger series;

FIG. 5 A matrix corresponding to FIG. 2 but for a different embodiment.

Transmissions 1 and 2 shown in FIG. 1 each have a variable gear stage, 3 and 4 respectively, enclosed by a broken line. These have the different respective centre distances $A_{i+1}$ and $A_i$. The same pinion or first gear 5 is used in both cases whereas the second gears, wheels 6 and 7 (the lower part of which is cut away in the drawing) differ in size. As wheel 6 is larger than wheel 7, the transmission ratio in variation stage 3 is greater than that in variation stage 4. If it is assumed in the example that pinion 5 is located on the drive side of the transmission and rotates at a given torque at a given speed, then the torque at axis 8 of wheel 6 is correspondingly higher than that at axis 9 of wheel 7. Accordingly, gear stages 14 and 15 on the output side are differently designed. In the illustrated example there is only one gear stage on the output side comprising the pinion 10,12 and the wheel 11,13 respectively. The higher loading capacity of transmission 1 corresponds also to its greater centre distance $D_1$ on the output side compared to the smaller centre distance $D_2$ on the output side of transmission 2. The shafts and bearings of transmission 1 are, of course, more amply dimensioned to cater for the higher loading capacity.

The illustrated embodiment is designed as coaxial gear transmission the centre distances $A_{i+1}$ and $D_1$ and $A_i$ and $D_2$ being equal. However, the invention is also suitable for transmissions of other designs, e.g. helical-bevel gear stages. The shaft arrangement and the relationship between the centre distances of different stages can also be different.

As mentioned above, the various transmissions of a given size preferably differ only in regard to their variation stages 3 and 4, i.e. the different total transmission ratios within one size of a transmission series are achieved only by the different transmission ratios of the variation stage.

Within the variation-stage series a sequence of different sizes is designed with one and the same gearwheel (in this case the pinion 5). The upper part of FIG. 1 shows a portion of matrix M defined by the centre distances $A_i$ and the ratios $I_i$.

FIG. 2 shows a matrix M with the variation-stage gear characteristics of a series of transmissions in accordance with the invention. The rows in the matrix correspond to different sizes $B_i$ with the centre distances $A_i$, the numerical values of which are shown in the right-hand column. As those skilled in the art will realize, the maximum torques for a given centre distance are determined by the various tooth parameters and in particular by their material, facewidth and design.

The four columns relate to four different nominal transmission ratios $I_i$, the numerical values of which are shown on the top line. These values represent the "idealized" or "theoretical" graduation of transmission ratios within the meaning explained below. The following gear characteristics are indicated in each box of the matrix:

Top left corner: quotient denoting the numbers of teeth of wheel and pinion and consequently indicating the actual transmission ratio. In the left-hand column this quotient is in each case 120/12, giving an actual transmission ratio of 10.

Bottom right corner: module m of the gear set. The module (German: "Modul") is the pitch diameter d divided by the number of teeth z: $m = d/z$.

Centre: the expression in brackets is explained below.

It is apparent from the Figure that the total of 16 different centre distance/transmission ratio combinations calls for only 7 different pinions which are in each case characterized by module and number of teeth. For instance, the pinion with the module of 1.43 and 12 teeth in the central diagonal of the matrix is used for the sequence $S_1$ with the values $A_4/I_4, A_3/I_3, A_2/I_2$ and $A_1/I_1$. The pinion with the module 1.18 (also with 12 teeth) is used for the sequence $S_2$ ($A_3/I_4$, $A_2/I_3$ and $A_1/I_2$). Similarly, the pinion with the module 1.74 is capable of being used in a sequence $S_5$ of the series comprising three transmissions. The pinions with the modules 2.11 and 0.97 are in each case used in a sequence ($S_6, S_3$) comprising two transmissions. Only two pinions, i.e. those with the modules 0.80 and 2.57 are in each instance used in only one variation stage.

In the optimum case presented, each complete diagonal of the matrix represents a variation-stage sequence for which the same pinion is used with the same gearwheel. For a $(n \times m)$ matrix the number of necessary gearwheels N is reduced to:

$$N = n \times m + v \times (n+m-1) \text{ instead of:}$$
$$N = n \times m \times (1+v),$$

where
n = number of centre distances
m = number of transmission ratios
v = number of different connection variants If in practice some variation stages in matrix M are not required, these can, of course, be eliminated. It follows that not every possible combination of centre distances and transmission ratios has to be provided. This is the sense in which the expression "permissible" sizes $B_i$ and "permissible" transmission ratios $I_i$ is to be understood.

With a knowledge of the invention, the relationships of gear geometry on which it is based are easily explained. Reference is made here to FIG. 3.

The centre distance A of the two variation stage gearwheels must be equal to the sum of their pitch circle radii: $A = R_1 + R_2$. The transmission ratio is determined by the relationship of the radii: $I = R_2/R_1$. From these two constraints it directly follows that a given pinion with the pitch-circle radius $R_1$ can be used in different variation stages with different centre distances only if the following expression is satisfied:

$$A = R_1(I+1) \tag{1}$$

This condition is presented in FIG. 3 for seven different pinion pitch-circle radii $R_1(S_i)$. The linear function corresponds in each case to a straight line 20 to 26 which cuts the I coordinate at minus 1 and has a gradient corresponding to $R_1$.

In dimensioning the variation stage of a transmission series in accordance with the invention, one should start with the maximum torque and the maximum nominal transmission ratio. It has been found that generally this assures the adequate dimensioning of all other variation stages in a series designed in accordance with the invention. Using the standard procedures of gear technology, the maximum centre distance of the variation stage axes is calculated from the maximum torque with due regard for the customary parameters (material, tooth width, gear type, etc.). In the example given, this results in the value $A_4 = 100.5$ mm. A given highest transmission ratio, e.g. $I_4 = 10$, corresponds to a specific point $P_1$ in the A-I plane shown in FIG. 3. This determines $R_1$ for a sequence $S_1 R_1(S_1) = 9.1$ mm. All the variation stages which are to be fitted with the same gearwheel having this pitch-circle radius must lie on straight line 20.

Thereafter the next-smaller centre distance or the next smaller transmission ratio can be freely chosen. It is assumed in FIG. 3 that a centre distance of $A_3=82.7$ mm is required. To achieve this with the same pinion ($P_2$), the transmission ratio has to be 8.1. This simultaneously determines another pinion ($R_1(S_2)=7.5$ mm) with which a transmission ratio of 10 is obtained with a centre distance of 82.7 mm($P_3$).

This again leads on to the next centre distance of 68.1 mm to attain the desired transmission ratio of 8.1 ($P_4$). This centre distance in turn produces the next pinion size ($R_1(S_3)=6.2$ mm) for a transmission ratio of 10.0 ($P_5$).

If the straight line 22 for this pinion is followed down to a transmission ratio of 8.1 ($P_6$), the centre distance $A_1$ is found to be 56.0 mm, which again determines the fourth pinion ($R_1(S_4)=5.1$ mm).

From the determination of the centre distances $A_2$ and $A_1$ it directly follows that the further transmission ratios must have the values $I_2=6.4$ and $I_1=5.1$ mm in order to encompass all the variation stages in the matrix with the minimum number of pinions. Hence the radii of the pinions used in the bottom right half of the matrix work out at $R_1(S_5)=11.1$ mm, $R_1(S_6)=13.5$ mm and $R_1(S_7)=16.4$ mm. To facilitate coordination, the corresponding point in FIG. 3 is in each case indicated in brackets in the centre of the boxes in FIG. 2.

The considerations explained on the basis of FIG. 3 lead directly to the idealized gear radii and transmission ratios for each variation stage in the series. The actual characteristics used in practice can be empirically determined on this basis bearing in mind the following points:

a) Of course, the number of teeth can only be changed in integral steps. An effort is also usually made to ensure that the numbers of teeth of the meshing gears have no common divisor.

b) To lower costs, the specialist will endeavor to minimize the number of teeth. With regard to the number of teeth, too, it is expedient to work from the variation stage with the highest torque and the highest transmission ratio ($T_4/I_4$).

c) The use of helical gears and different tooth flank profiles lead to further divergences from the idealized parameters described.

The rules for correlating the graduation of the centre distances $A_i$ and the transmission ratios $I_i$ in a variation stage for the purpose of this invention can under idealized conditions be summarized by the following equation:

$$\frac{A_i}{A_{i-1}} = \frac{I_i + 1}{I_{i-1} + 1} = C = \text{const.} \quad (2)$$

Consequently within one series either the relationship of neighboring permissible centre distances $A_i:A_{i-1}$ or the relationship between neighboring permissible transmission ratios $(I_i+1):(I_{i-1}+1)$ can be chosen once by terminating the constant C. This fixes the graduation of all other "idealized" (or "theoretical") centre distances and transmission ratios.

Under practical conditions the rule expressed by equation (2) generally is not followed exactly. In addition to points a) to c) listed before there are oftentimes requirements according to which it is desired that the graduation of the $I_i$ and of the $A_i$ follows rules which are not quite consistant with equation (2). In many cases such requirements can be fulfilled and still the advantages of the instant invention can at least to some extent be used by deviating to some extent from the idealized graduation of equation (2).

In order to secure the maximum benefit of the invention each of the sequences $S_1, S_2$. . . of variation stage sizes using the same pinion (or more generally speaking the same gear) should comprise all variation stages of the series whose centre distances $A_i$ and transmission ratios $I_i$ lie on one diagonal of the matrix. This is the case in all examples given in this specification. However, if there are requirements which dictate deviation from the graduation of equation (2) it may have to be accepted that the sequences of variation stage sizes in which the same pinion is used are shorter than the total diagonal of the matrix. Preferably the graduation of the $A_i$ and $I_i$ should be such that at least one variation stage sequence comprises at least three variation stage sizes incorporating the same gearwheel.

Generally speaking one may say that deviations from the exact graduation of $A_i$ and $I_i$ within a certain transmission series from formula (2) should preferably be smaller than $+/-5\%$, more preferably smaller than $+/-3\%$.

In this context it should be mentioned that the term "transmission series" as understood herein does not necessarily correspond to what a certain manufacturer offers as a "series" within his program. In particular it is obvious that a manufacturer may combine two or more series in the sense of the instant invention (i.e. having a graduation of transmission ratios $I_i$ and centre distances $A_i$ essentially corresponding to equation (2), "essentially" understood within the limitations mentioned before) to make a sector of his production program which he calls "series".

Generally it is found in practice that extremely satisfactory results can on the whole be obtained on the basis of the present invention. To illustrate this by example, FIG. 4 reproduces a matrix of the characteristics of a series of variation stages comprising in each case seven different sizes and transmission ratios. The data in the boxes correspond to those in FIG. 2. It is apparent that, even in the case of such a comprehensive series, the invention minimizes the number of pinions needed in the variation stage (13 instead of 49 in the example). The example refers to an actual helical-gear transmission.

In FIG. 4 again the same number of teeth $Z_1=12$ is used for the pinions of a plurality of the different sequences. This allows one to use the minimum number of teeth possible under the given design restrictions of the particular case for most of the variation stages. It is known in the art that such minimum number of teeth allows the maximum permissible torque load. In the example of FIG. 4 an increase in the number of gear teeth is required only for the larger variation stages and small transmission ratios.

In an alternative embodiment of the invention the pinions of differing sequences do not have the same number of teeth but the same module. Obviously as a consequence of this the gearwheels meshing with these pinions also have the same module. This substantially reduces the production expenditure since different pinions and gearwheels can be produced with the same tools.

An example of this embodiment is shown in FIG. 5. Here all gearwheels of the matrix have only three different modules namely 0.8, 1.4 and 2.5.

What is claimed is:

1. A series of gear transmissions comprising:
a plurality of gear transmissions of different sizes ($B_i = B_1 \ldots B_m$) and different transmission ratios ($I_i = I_1 \ldots I_n$);
a variable gear stage in each of said plurality of transmissions comprised of a first gear and a second gear meshing with said first gear, said first gear and said second gear having a different center distance ($A_i = A_1 \ldots A_m$) for each transmission size ($B_i$); said variable gear stage within said series of gear transmissions comprising:
(i) a range of permissible sizes ($B_i = B_1 \ldots B_m$) with respective center distances ($A_i = A_1 \ldots A_m$) and
(ii) a range of permissible nominal transmission ratios ($I_i = I_1 \ldots I_n$) which is the same for all sizes ($B_i$), so that the center distances ($A_i$) and the transmission ratios ($I_i$) form a matrix (M),
said graduated center distances and transmission ratios being correlated so that a same size first gear is common to a variation stage sequence (S) comprising a plurality of different transmission size and ratio combinations of said matrix.

2. A series of gear transmissions according to claim 1, wherein said same size first gear is common to a plurality of variation stage sequences ($S_i = S_1 \ldots S_m$) each comprising a plurality of different transmission size and ratio combinations of said matrix.

3. A series of gear transmissions according to claim 1 or 2, wherein said same size first gear is common to at least three different transmission size and ratio combinations (B-I) in at least one variation stage sequence ($S_i$).

4. A series of gear transmissions according to claim 3, wherein the at least one variation stage sequence ($S_i$) comprises all of the transmission size and ratio combinations (B-I) which lie on a single diagonal of the matrix.

5. A series of gear transmissions according to claim 4, wherein the same size first gear common to a variation stage sequence ($S_i$) has the same number of teeth as a first gear of different size in at least one other variation stage sequence.

6. A series of gear transmissions according to claim 4, wherein the same size gear common to a variation stage sequence ($S_i$) has the same module as a first gear of a different size in at least one other variation stage sequence.

7. A series of gear transmissions according to claim 1 or claim 2, wherein a same size first gear which is common to a variation stage sequence is provided in different shaft designs with each design providing a different connection variant.

8. A series of gear transmissions according to claim 1 or claim 2, wherein each of said plurality of transmissions is a multi-stage transmission including a variable gear stage and other gear stages and said other gear stages are identical in each of said transmissions wherein the variable gear stage is of a same size ($B_i$).

9. A series of gear transmissions comprising:
a plurality of transmissions of different sizes ($B_i = B_1 \ldots B_m$) and different transmission ratios ($I_i = I_1 \ldots I_n$);
a variable gear stage in each of said plurality of transmissions comprised of a first gear and a second gear meshed with said first gear, said first gear and said second gear having a different center distance ($A_i = A_1 \ldots A_m$) for each transmission size ($B_i$);
a matrix comprised of graduated center distances ($A_i$) on one axis and graduated transmission ratios ($I_i$) on a second axis, said graduated center distances and transmission ratios being correlated with a same size first gear common to a variation stage sequence (S) comprising a plurality of different transmission size and ratio combinations of said matrix; and
said first gear and said second gear are selected from said matrix for each size and ratio of said plurality of transmissions.

* * * * *